Patented July 17, 1951

2,561,323

UNITED STATES PATENT OFFICE 2,561,323

METHOD OF PREPARING GLUTAMIC ACID MONO ESTERS

Coy Webster Waller, Pearl River, N. Y., and John Christie Paterson, Westfield, N. J., assignors to American Cyanamid Company, New York, N. Y., a corporation of Maine No Drawing. Application December 21, 1948, Serial No. 66,568

9 Claims. (Cl. 260—482)

The present invention relates to an improved method of preparing glutamic acid derivatives. More particularly, it relates to the preparation of gamma lower alkyl esters of glutamic acid.

With the recent discovery that polypeptides of pteroylglutamic, such as pteroyl-gamma-glutamyl-gamma-glutamylglutamic acid, have physiological properties similar to those of folic acid (see J. A. C. S. 70, pages 1099–1102; March 1948), gamma lower alkyl esters of glutamic acid have become important intermediates in the preparation of said compounds.

The preparation of gamma lower alkyl esters of glutamic acid such as gamma-ethyl glutamate, is described in Bergmann and Zervas (Ztschr. Physiol. Chem. 221; vol. 52; (1933)). The preparation of gamma-ethyl gutamate by this method is undesirable for several reasons. First, the method is limited to the preparation of small amounts of material, since it is necessary to remove the alcohol in order to obtain the product. If the alcohol is not removed within a short time, diesterification takes place. This process then precludes the preparation of gamma-alkyl esters of gutamic acid on a large scale. Secondly, the product is obtained as the hydrochloride salt and requires another step in order to obtain the base, in which form it is most desirable as an intermediate.

We have found that gamma lower alkyl esters of glutamic acid can be prepared on a large scale in excellent yields by reacting glutamic acid, a lower aliphatic alcohol and substantially 100% sulfuric acid and after the mono ester is formed, stopping the esterification and precipitating the desired product by the addition of an organic alkaline substance.

A number of alkaline substances can be used to stop esterification and precipitate the glutamic acid mono ester. The most desirable substances are the amines, such as diethylamine, diethanolamine and the like, since they precipitate the product as the base and eliminate the mineral acid as a soluble amine salt. Although not as desirable as the amines, other alkaline substances can be used such as sodium methylate, sodium ethylate, etc. These compounds are not as desirable by reason of the fact that they neutralize the acid by the formation of an inorganic salt which must be separated from the desired product. The alkaline substance is added until the pH of the reaction mixture is from 7.1 to 8.5, at which pH the gamma lower alkyl esters of glutamic acid are least soluble and can be recovered as a precipitate.

As a condensing agent we prefer to use substantially 100% sulfuric acid, although hydrogen chloride can be used. Sulfuric acid is preferred as it is less expensive and more easily handled than hydrogen chloride. When using 100% sulfuric acid as a condensing agent it is preferable to filter the desired product at room temperature and to remove any sulfates present by washing with warm alcohol. However, if hydrogen chloride is used as a condensing agent, it is preferred to filter the product and wash out any chlorides with alcohol at about 60° C.

In carrying out the reaction the lower aliphatic alcohol acts as a solvent. We can use methanol, ethanol, propanol, isopropanol, butanol, isobutanol and the like. Also substituted lower aliphatic alcohols may be used such as benzyl alcohols may be used such as benzyl alcohol, phenylethanol, etc.

The formation of the mono ester of glutamic acid will take place over a period of from ¼ hour to 6 hours. When using sulfuric acid, it is preferable to use from about 2 hours to about 6 hours, and when using hydrogen chloride, about from ¼ hour to about 1½ hours.

The reaction may be carried out at a temperature of from 0° C. to about 65° C. When using sulfuric acid as a condensing agent, it is preferred that the reaction be carried out at a temperature of about 30° C. to about 50° C. and that the reaction mixture be cooled after the addition of alkaline substance and prior to filtration. When hydrogen chloride is used, we prefer a temperature range of from 20° C. to 30° C.

The following examples illutsrate in detail the preparation of characteristic mono-alkyl esters of glutamic acid.

Example 1

To a solution of 60 g. of hydrogen chloride in 1 liter of anhydrous ethanol is added 100 g. of glutamic acid and the resultant solution stirred for 55 minutes at 20°–25° C. At the end of this time a solution of 190 ml. of diethanolamine in 190 ml. of anhydrous ethanol is run into the reaction solution. The solution will now test faintly alkaline on brilliant yellow test paper. The product begins to precipitate at about 37° C. and the temperature slowly increases to about 42° C. The reaction mixture is then cooled to about 30° C., filtered and washed halide-free with anhydrous ethanol. A yield of 88 g. (74%) of dried gamma-ethyl glutamate is obtained. The product melted at 177.7°–178.3° C. It should be noted, however, that the melting point of this product varies according to the heating rate and the beginning bath temperature. Under the best conditions the melting point is about 190° C.

Example 2

To a solution of 120 g. of hydrogen chloride in 2 liters of anhydrous ethanol is added 200 g. of glutamic acid and the resultant solution stirred for 55 minutes at about 20°–25° C. To this solution is then added a mixture of 193.3 g. of sodium methylate in 985 ml. of anhydrous ethanol. The reaction mixture tests faintly alkaline on brilliant yellow test paper. The temperature of the reaction rises to about 57° C. After cooling to 30° C., the product is filtered off, washed and dried. A yield of 190 g. (80% of theory) of gamma-ethyl glutamate is obtained.

Example 3

In a reaction similar to Example 2 except that pyridine is used in place of sodium methylate, a yield of 33.6% of theory of gamma-ethyl glutamate is obtained.

Example 4

To a solution of 30 g. of hydrogen chloride in 500 ml. of anhydrous ethanol is added 50 g. of glutamic acid and the resultant solution is stirred for about 55 minutes at 30° C. At the end of this time a solution of 93 ml. of diethylamine in 300 ml. of anhydrous ethanol is run into the reaction solution. The reaction tests faintly alkaline on brilliant yellow test paper. The reaction temperature rises to about 48° C. The product is then filtered at 48°–50° C. and washed halide-free with hot (60° C.) ethanol. Yield 49.2 g. (83%) of gamma-ethyl glutamate, having a melting point of 179.9°–180.3° C.

Example 5

140 g. of glutamic acid is added to a solution of 112.8 g. of 100% sulfuric acid in 1400 ml. of anhydrous ethanol. The solution is stirred at 45° C. for about four hours. To this is then added a solution of 238 ml. of diethylamine in 800 ml. of anhydrous ethanol. The reaction mixture tests faintly alkaline on brilliant yellow test paper. During the reaction the temperature increases to about 62° C. The mixture is cooled to 20° C. and filtered. The precipitate is washed with ethanol having a temperature of about 20° C. and is then further washed 3 or 4 times with ethanol having a temperature of about 60° C. to remove all traces of sulfates. The product weighed 132 g. representing a yield of 79.3%. On analysis for carbon, hydrogen and nitrogen, the product was in close agreement with the theoretical values for gamma-ethyl glutamate.

Example 6

35 g. of glutamic acid is added to a solution of 28.2 g. of 100% sulfuric acid in 192 ml. of methanol and the reaction stirred at 45° C. for 4 hours. A solution of 42.7 g. of diethylamine in 137 g. of methanol is added and the resulting mixture produces a faint spot on water wet brilliant yellow test paper. The temperature of the reaction rises to about 58° C. The mixture is cooled to 50° C. and filtered. The precipitate is washed with 45° C. methanol to remove traces of sulfate ions. A yield of 21 g. (54.5%) of gamma-methyl glutamate, having a melting point of 172.6°–173.6° C., is obtained.

Example 7

To 28.2 g. of 100% sulfuric acid mixed with 360 g. of n-propanol is added 35 g. of glutamic acid and the reaction stirred at 45° C. for about 4 hours. Then a solution of 42.7 g. of diethylamine in 257 g. of n-propanol is added to a faint spot on water wet brilliant yellow test paper. The temperature of the mixture rises to 55° C. The mixture is cooled to 45° C. and filtered. It is then washed sulfate-free with n-propanol. A yield of 31 g. (69%) of product, melting at 184.8°–185.3° C. is obtained. On analysis for carbon, hydrogen, and nitrogen, the theoretical values agreed closely with those for gamma-n-propyl glutamate.

Example 8

To a solution of 56.4 g. of 100% sulfuric acid in 888 g. of n-butanol is added 70 gms. of glutamic acid and the reaction mixture stirred for 4 hours at 45° C. Then a solution of 85.4 g. of diethylamine in 500 ml. of n-butanol is added and the resulting mixture gives a faint spot on water wet brilliant yellow test paper. The temperature of the reaction rises to about 56° C. The reaction mixture is cooled to 20° C. and filtered and the cake is washed sulfate-free with n-butanol. A yield of 74 g. (76.5%) of gamma-n-butyl glutamate, melting at 176.8°–177.3° C. is obtained.

Example 9

To a solution of 56.4 g. of 100% sulfuric acid in 1296 g. of anhydrous benzyl alcohol is added 70 g. of glutamic acid and the solution stirred at 45° C. for 4 hours. Then a solution of 119 ml. of diethylamine in 700 ml. of benzyl alcohol is added to a faint spot on brilliant yellow paper. The temperature of the reaction mixture rises to 57° C. The reaction mixture is cooled to 20° C., filtered and washed sulfate-free with benzyl alcohol. The gamma-benzyl glutamate weighed 97.5 g. and represented and 86% yield. The melting point of the product is 168.0° C.–169.5° C.

We claim:

1. A method of preparing a gamma lower alkyl ester of glutamic acid which comprises mixing glutamic acid, a lower aliphatic alcohol and a substantially anhydrous mineral acid, allowing the reaction to take place for from ¼ hour to 6 hours, precipitating the product with an organic alkaline substance and recovering said glutamic acid mono ester therefrom.

2. A method of preparing a gamma lower alkyl ester of glutamic acid which comprises mixing glutamic acid, a lower aliphatic alcohol and substantially 100% sulfuric acid, allowing the reaction to take place for from 2 hours to 6 hours, precipitating the product with an organic alkaline substance and recovering said glutamic acid mono ester therefrom.

3. A method of preparing a gamma lower alkyl ester of glutamic acid which comprises mixing glutamic acid, a lower aliphatic alcohol and substantially 100% sulfuric acid, allowing the reaction to take place for from 2 hours to 6 hours, precipitating the product with diethylamine and recovering said glutamic acid mono ester therefrom.

4. A method of preparing gamma-ethyl glutamate which comprises mixing glutamic acid, substantially anhydrous ethanol and a substantially anhydrous mineral acid, allowing the reaction to take place for from ¼ hour to 6 hours, precipitating the product with an organic alkaline substance and recovering said gamma-ethyl glutamate therefrom.

5. A method of preparing gamma-ethyl glutamate which comprises mixing glutamic acid, substantially anhydrous ethanol and 100% sulfuric acid, allowing the reaction to take place for from 2 hours to 6 hours, precipitating the product with diethylamine and recovering said gamma-ethyl glutamate therefrom.

6. A method of preparing gamma-methyl glutamate which comprises mixing glutamic acid, substantially anhydrous methanol and 100% sulfuric acid, allowing the reaction to take place for from 2 hours to 6 hours, precipitating the product with diethylamine and recovering said gamma-methyl glutamate therefrom.

7. A method of preparing gamma-propyl glutamate which comprises mixing glutamic acid, substantially anhydrous propanol and 100% sulfuric acid, allowing the reaction to take place for from 2 hours to 6 hours, precipitating the product with diethylamine and recovering said gamma-propyl glutamate therefrom.

8. A method of preparing gamma-ethyl glutamate which comprises mixing glutamic acid, substantially anhydrous ethanol and hydrogen chloride, allowing the reaction to take place from ¼ hour to 1½ hours, precipitating the product with diethylamine and recovering said gamma-ethyl glutamate therefrom.

9. A method of preparing gamma-benzyl glutamate which comprises mixing glutamic acid, substantially anhydrous benzyl alcohol and 100% sulfuric acid, allowing the reaction to take place for from 2 hours to 6 hours, precipitating the product with diethylamine and recovering said gamma-benzyl glutamate therefrom.

COY WEBSTER WALLER.
JOHN CHRISTIE PATERSON.

REFERENCES CITED

The following references are of record in the file of this patent:

Abderhalden et al.: Zeit. Physiol. Chem., 219, 155–157 (1933).